United States Patent
Man et al.

(10) Patent No.: US 6,582,333 B2
(45) Date of Patent: Jun. 24, 2003

(54) TRANSMISSION FOR USE IN THE POWER TRAINS OF MOTOR VEHICLES

(75) Inventors: Laszlo Man, Ottersweier-Unzhurst (DE); Rene Daikeler, Ottersweier (DE)

(73) Assignee: LuK Lamellen und Kupplungsbau Beteiligungs KG, Buhl (DE)

(*) Notice: Subject to any disclaimer, the term of this patent is extended or adjusted under 35 U.S.C. 154(b) by 6 days.

(21) Appl. No.: 09/975,172

(22) Filed: Oct. 10, 2001

(65) Prior Publication Data

US 2002/0045508 A1 Apr. 18, 2002

(30) Foreign Application Priority Data

Oct. 12, 2000 (DE) .......................... 100 50 637

(51) Int. Cl.⁷ ............................. F16H 3/72; F16H 3/74
(52) U.S. Cl. ........................ 475/5; 475/154; 475/259; 475/260; 475/267; 192/17 R; 192/48.92; 192/107 T
(58) Field of Search ................ 475/5, 154, 257, 475/258, 259, 260, 267, 331, 348; 477/3; 192/17 R, 17 D, 48.9, 48.92, 107 T; 74/7 C, 7 E (56) References Cited

U.S. PATENT DOCUMENTS

| | | | | |
|---|---|---|---|---|
| 2,467,627 A | * | 4/1949 | Olson | 475/12 |
| 4,271,948 A | * | 6/1981 | Yew | 192/107 T X |
| 4,450,942 A | * | 5/1984 | Takefuta et al. | 192/48.9 |
| 4,674,612 A | * | 6/1987 | Ogura | 192/48.92 |
| 5,330,393 A | * | 7/1994 | Deppert et al. | 475/154 |
| 5,418,400 A | * | 5/1995 | Stockton | 74/7 E X |
| 6,371,877 B1 | * | 4/2002 | Schroeder et al. | 475/5 |
| 2002/0117860 A1 | * | 8/2002 | Man et al. | 475/5 X |

FOREIGN PATENT DOCUMENTS

| | | | | |
|---|---|---|---|---|
| DE | 19941705 | * | 3/2000 | |
| JP | 59-155634 | * | 9/1984 | 192/48.92 |

\* cited by examiner

*Primary Examiner*—Saul Rodriquez
*Assistant Examiner*—Ha Ho
(74) *Attorney, Agent, or Firm*—Darby & Darby (57) ABSTRACT

The power train of a motor vehicle has an engine which normally drives the wheels and can be started by an electric motor which acts as a generator once the engine is started. The torque transmitting connection between the crankshaft of the engine and a shaft of the motor includes a planetary and one or more freewheels of the type employing an elongated belt surrounding a rotary part and being surrounded by the internal surface of a hollow part. The belt or belts can be urged into or released from frictional engagement with one of the adjacent surfaces by centrifugal force and/or by an electromagnet.

20 Claims, 3 Drawing Sheets

TRANSMISSION FOR USE IN THE POWER TRAINS OF MOTOR VEHICLES

CROSS-REFERENCE TO RELATED CASES

This application claims the priority of the commonly owned copending German patent application Ser. No. 100 50 637.2 filed Oct. 12, 2000. The disclosure of the aforesaid priority application, as well as that of each U.S. and foreign patent and/or patent application identified in the specification of the present application, is incorporated herein by reference.

BACKGROUND OF THE INVENTION

The present invention relates to improvements in power trains, especially in power trains which can be utilized in motor vehicles, and more particularly to improvements in torque transmitting arrangements which can be utilized in a power train for controlled transmission of torque between a driving unit and a driven unit, e.g., between a first machine (such as a combustion engine) and a second machine (such as an electrical machine which can serve as a motor or as a generator). Still more particularly, the instant invention relates to improvements in power trains of the type capable of automatically reversing the direction of torque transmission in response to changes in the direction of rotation of the output member of one of the units and the direction of rotation of the input member of the other unit.

Power trains of the class to which the present invention pertains are disclosed, for example, in commonly owned German patent application Serial No. 199 41 705 (published Mar. 16, 2000). Such power trains are or can be designed to employ at least one freewheel. A drawback of freewheels which are proposed to be employed in power trains of the character disclosed in the published German patent application Serial No. 199 41 705 is that their freewheels are expensive, bulky and heavy, especially when their diameters are large or extra large. Another drawback of conventional power trains employing one or more freewheels is that they tend to generate noise if the parts of the power train (such as the output member of the prime mover) perform vibratory and/or other undesirable stray movements.

OBJECTS OF THE INVENTION

An object of the present invention is to provide a power train which employs at least one freewheel and is less expensive than but at least as reliable as similar power trains of presently known construction.

Another object of the invention is to provide novel and improved freewheels for use in the power trains of motor vehicles.

A further object of the instant invention is to provide a power train which is less likely to generate noise than heretofore known and utilized power trains.

An additional object of the invention is to provide a novel and improved connection between the prime mover and one or more electric machines in the power train of a motor vehicle.

Still another object of the invention is to provide a motor vehicle which embodies the above outlined power train.

A further object of our invention is to provide a novel and improved method of operating the above outlined power train.

Another object of this invention is to provide a novel and improved combination of a planetary transmission with one or more flywheels for use in the power train of a motor vehicle.

An additional object of this invention is to provide a novel and improved combination of an infinitely variable transmission and one or more freewheels for use in the power train of a motor vehicle.

Still another object of the invention is to provide a novel and improved transmission which is automatically shiftable in response to changes of the direction of (forward or rearward) movement of a motor vehicle and which embodies one or more freewheels constructed and assembled in a novel and improved way.

SUMMARY OF THE INVENTION

The invention is embodied in a power train which can be utilized with advantage in motor vehicles and comprises a variable-speed prime mover machine having a rotary element, at least one electrical machine, and means for transmitting torque between the rotary element of the prime mover machine and the at least one electrical machine. The torque transmitting means comprises a planetary and at least one engageable and disengageable freewheel between the planetary and one of the machines. The at least one freewheel includes an elongated band having a first friction surface engageable with a first complementary surface provided on a rotary component of the planetary or the one machine and a second friction surface engageable with a second complementary surface on a component of the one machine or the planetary. One of the components is rotatable relative to the other component when at least one of the friction surfaces is disengaged from the respective complementary surface.

The prime mover machine can include an internal combustion engine and the rotary element can constitute a shaft (such as a crankshaft) of the engine. The at least one electrical machine can be arranged to start the engine during a first stage of operation of the power train, and the engine is or can be arranged to drive the at least one electrical machine during a second stage of operation of the power train. The at least one electrical machine can constitute a generator which is arranged to convert mechanical energy into electrical energy at least during the second stage of operation of the power train.

The planetary comprises or can comprise a rotary sun gear member, a planet carrier member, at least one planet pinion member which is rotatably journalled in the carrier member and mates with the sun gear member, and an internal gear member which mates with the at least one pinion member. A portion of the band can be fixedly connected to one of the aforementioned members forming part of the planetary. The torque transmitting means can further comprise a second freewheel which is operable to transmit torque between two members of the planetary. The at least one freewheel can be assembled to be operable to transmit torque between a member of the planetary and a housing of the prime mover machine.

The at least one freewheel can be constructed, assembled and installed for an operation such that it transmits torque between the rotary element of the prime mover machine and a member of the planetary, an a second freewheel of the torque transmitting means can be actuated to transmit torque between a member of the planetary and the at least one electrical machine. Alternatively, the at least one freewheel can be arranged to transmit torque between the sun gear member and the planet carrier member, and the torque transmitting means of such power train can further comprise a second freewheel which is operable to transmit torque between the internal gear member and a housing of the prime mover machine.

The band can include a friction lining and one of the aforementioned friction surfaces is then provided on such friction lining. The friction lining can be of one piece and can extend lengthwise of the band; alternatively, the friction lining can include a plurality of discrete sections which are spaced apart from each other lengthwise and/or transversely of the band.

It is also possible to provide the at least one freewheel with a layer of slippage promoting agent which is applied to one of the two friction surfaces of the band. As already mentioned hereinabove, the band can include a friction lining, and the other of the friction surfaces is then provided on such friction lining.

The slippage promoting agent can contain a plastic material, e.g., a fluorpolymer.

The band can be installed in tensioned condition and is or can be out of contact with one of the complementary surfaces in the disengaged condition of the freewheel.

The band can be arranged to become disengaged from one of the complementary surfaces under the action of centrifugal force; alternatively, or in addition to the ability of the band to become disengaged from the adjacent complementary surface under the action of centrifugal force, the means for changing the condition of the freewheel can include an electromagnet.

If the torque transmitting means of the improved power train further includes a second freewheel which is arranged to operate counter to the at least one freewheel, the two freewheels can have a switching point at a predetermined rotational speed of the output element. One of the freewheels can be disposed in a power flow between the sun gear and the planet carrier of the planetary; the other freewheel is then disposed between the internal gear of the planetary and a housing of the prime mover machine.

The improved power train can further include at least one flywheel, e.g., a flywheel which is affixed to the rotary element of the prime mover machine.

The novel features which are considered as being characteristic of the invention are set forth in particular in the appended claims. The improved power train itself, however, both as to its construction and the modes of assembing and operating the same, together with numerous additional important features and attributes thereof, will be best understood upon perusal of the following detailed description of certain presently preferred specific embodiments with reference to the accompanying drawing.

DESCRIPTION OF PREFERRED EMBODIMENTS

Figure 1:
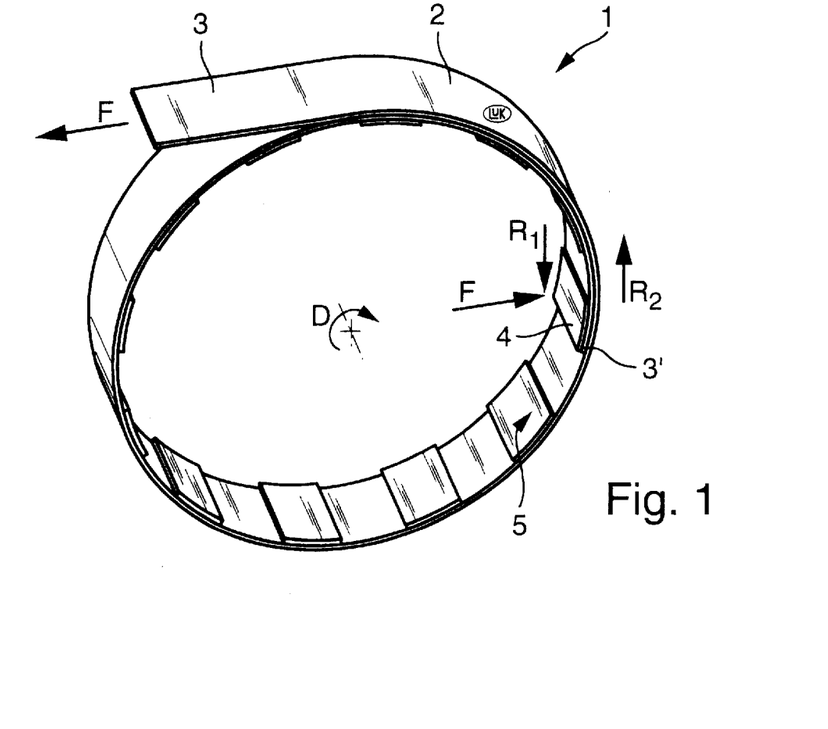
FIG. 1 is a perspective view of the band of a pull-type freewheel which can be utilized in the torque transmitting system of the improved power train.

FIG. 1 shows a freewheel 1 which comprises a flexible band 2 (preferably a metallic band) wound around a cylindrical part, e.g., a shaft (not shown), in such a way that it forms a complete convolution or more than a complete convolution (e.g., at least two complete con-volutions). The illustrated band 2 has a length such that a median portion thereof overlies or overlaps the end portion 3' and that the other (outer) end portion 3 is offset relative to the end portion 3' by an angle of close to 180°. The end portion 3 is affixed to a component part of the power train in which the freewheel 1 is put to use, e.g., to a component part which is stationary relative to the part (shaft) surrounded by the band 2. For example, the complementary component part can include or constitute a part of a housing or casing of a prime mover, the sun gear or wheel of a planetary transmission or the planet carrier or internal gear of such transmission.

If the band 2 contacts the peripheral surface of the shaft, and if the shaft is rotated in the direction indicated by the arrow D (namely in a direction to move the end portion 3' of the band clockwise and away from the end portion 3), this results in the generation of a friction force $R_1$ which acts between the shaft and the band and brings about a reduction of the inner diameter of the band. It is assumed that the end portion 3 of the band 2 is held against movement with the end portion 3' by a force F. A second friction force $R_2$, which acts counter to direction of action of the force $R_1$, develops between those portions of the band 2 which overlie each other, i.e., along the arc extending from the end portion 3 to the end portion 3' as seen in the direction of the arrow D.

By properly selecting the friction coefficient $\mu(1)$ between the shaft and the band 2, and the friction coefficient $\mu(2)$ between the overlapping portions of this band, and by properly relating such friction coefficients to each other, namely in such a way that $\mu(1) > \mu(2)$, one can ensure that the shaft is subjected to a desired braking action. The friction coefficient $\mu(1)$ between the band 2 and the shaft can be increased by providing the respective (inner) surface of the band with a friction lining which can be a continuous lining or a composite lining including a plurality of spaced-apart sections. FIG. 1 shows a composite friction lining which includes an annular array of discrete equidistant or substantially equidistant sections or segments 4.

The material of the friction lining sections 4 is or can be identical with that which is employed, for example, for the making of friction linings for use on the clutch disc of a dry or wet friction clutch, in a torque converter or in a brake. It has been found that the operation of the freewheel 1 is satisfactory if the friction coefficient $\mu(1)$ is between about 0.1 and 0.5 (preferably about 0.3) and if the friction coefficient $\mu(2)$ equals or approximates 0.1. A braking force is applied to the shaft due to the so-called Eytelwein's friction or formula. The braking forces $R_1$ and $R_2$ are proportional to the force F and, therefore, the tensioning effect upon the band 2 is self-reinforcing or self-increasing.

Eytelwein's formula is described, for example, in the German-language publication entitled "HÜTTE, das Ingenieurs Taschenbuch" (meaning "HÜTTE, Engineers'Pocketbook") published by Wilhelm Ernst & Sohn, Berlin, Federal Republic Germany.

The frictional engagement between the band 2 and the shaft is relaxed if the shaft is caused to turn counter to the direction which is indicated by the arrow D; the shaft is then permitted to freewheel relative to the band 2 and relative to the part or parts to which the outer end portion 3 of the band is affixed.

It is often advantageous and preferred to ensure that the inner diameter of the band 2 increases when the freewheel 1 is idle, i.e., when the shaft and the band are free to turn relative to each other. The shaft is then free to turn relative to the band 2 in a clockwise and/or in a counterclockwise direction. In accordance with a feature of the present invention, the end portion 3 of the band 2 can be subjected to the action of a radially inwardly oriented force if one resorts, for example, to an actuator, an electromagnet or a ram which is operated by pressurized hydraulic or pneumatic fluid; this causes the band 2 to prevent angular movements of the shaft in a clockwise direction (arrow D) which, in turn, results in the provision of an engageable-disengageable (adjustable) freewheel adapted to be turned on or off by the simple expedient of providing means for biasing the end portion 3 radially inwardly (when necessary).

Alternatively, the improved freewheel can employ two bands which are convoluted around the shaft (e.g., next to each other) in opposite directions and together constitute a composite freewheel which can block rotation of the shaft relative to the composite freewheel in clockwise and counterclockwise directions.

Still further, it is possible to provide the composite friction lining including the sections 4 (or a one-piece friction lining) on the external surface of the shaft or to employ cooperating friction linings on the shaft as well as on the band or bands 2. The exposed surfaces 5 of the composite friction lining including the sections 4 shown in FIG. 1 then engage the adjacent surface(s) of the friction lining on the shaft.

Still further, the band 2 can be affixed to the shaft or, if not affixed to the shaft, it can cooperate with a fixed axial stop (provided that it exhibits adequate resistance to stretching or tearing).

Once the frictional engagement between the surfaces 5 of the friction lining sections 4 and the external surface of the shaft is relaxed, the shaft is released to turn—practically without any resistance—relative to the part which is affixed to the end portion 3 of the band and/or such part can turn relative to the shaft.

The sections 4 of the composite friction lining or a one-piece friction lining can be affixed to the band 2 by rivets, by resorting to an adhesive, or by resorting to hooks and/or analogous coupling or connecting devices.

The one-piece friction lining or its sections can be provided with grooves which extend circumferentially of the band 2. Furthermore, the band 2 can carry a composite friction lining including two or more neighboring strips extending longitudinally of the band.

Those intermediate portions of the band 2 which overlie each other offer a pronounced resistance to disengagement of the freewheel 1, especially if the band is long or very long (e.g., if the band includes two or more complete convolutions so that each of the overlapping intermediate parts includes at least one full convolution of the band). Such friction is satisfactory while the freewheel 1 is intentionally engaged but should become ineffective as expeditiously as possible preparatory to or during disengagement of the freewheel.

An undertaking which is effective to rapidly terminate the disengagement of frictionally engaged overlapping parts or sections or lengths of the band 2 is to provide at least one side of at least one such part with a film or layer of an antiseize or slippage promoting agent. Such agent can consist of or include a plastic substance such as a fluorpolymer (e.g., polytetrafluoroethylene) or an equivalent thereof (e.g., polyethylene). The films or layers can be applied if the thermal resistance is of secondary importance. The friction coefficient of the material of the layer or layers is relatively low. Such undertaking renders it possible to greatly reduce friction between those portions of the band 2 which overlap each other. Each such film can be secured to the band 2 by resorting to an adhesive, by establishing a chemically formed intermediate layer, by sintering, by partially melting the film prior to and during application to the band and/or mechanically by rivets, hooks, mating male and female parts and the like. Under certain specific circumstances, the film can be established by resorting to non-creeping fat, grease or the like.

As already mentioned above, the band 2 can be applied around the shaft under tension so that, if the shaft is turned relative to the internal surface of the complementary (such as hollow cylindrical) part in the direction indicated by the arrow D, angular movement of the shaft relative to the complementary part (and vice versa but in the opposite direction) is terminated practically instantaneously. As will be fully described hereinafter, such friction between the shaft and the complementary part can be terminated without delay, for example, by resorting to centrifugal force. This force causes the band to move radially outwardly and away from the peripheral surface of the shaft.

Alternatively, or in addition to the just discussed undertakings, it is advisable to select the stressing of the band 2 in such a way that the band does not abut the internal surface of the complementary (surrounding) part, i.e., the shaft and such part can turn relative to each other in response to a termination or sufficient reduction of friction between the shaft and the internal surface of the convoluted band. In lieu of or in addition to relying upon the centrifugal force, it is also possible to lift the band 2 off the shaft by an electromagnet or the like so that the engagement between the band and the complementary component is even stronger than solely under the action of centrifugal force and that such engagement increases (i.e., becomes even more pronounced) in response to increasing RPM of the part which carries the band.

Figure 2:
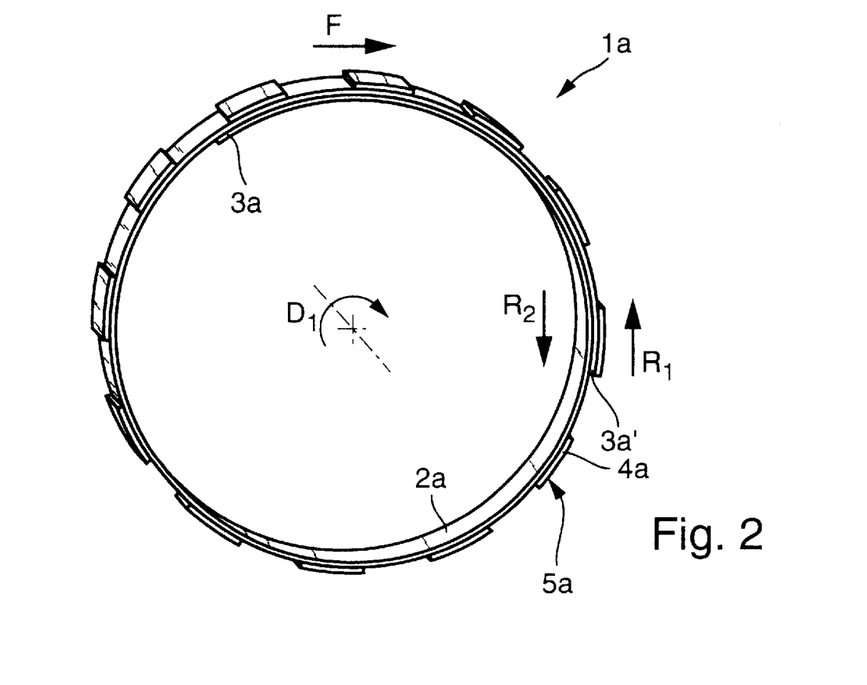
FIG. 2 is a similar perspective view of a push-type freewheel.

FIG. 2 shows a modified freewheel 1a having an elongated flexible band 2a which surrounds a shaft or another rotary part (not shown) and bears, due to its internal or residual stress, upon the cylindrical internal surface provided in a hollow rotary component (not shown). The external surface of the band 2a carries a composite friction lining including a series of preferably equidistant sections 4a having exposed external surfaces 5a which are or can be intended to increase the friction coefficient of the composite friction lining. The inner end portion 3a' of the band 2a is moved in the direction indicated by the arrow $D_1$ when the shaft is rotated in such (counterclockwise) direction, with the result that the shaft is braked. The shaft is free to turn relative to the band 2a in a direction counter to that indicated by the arrow $D_1$.

The freewheel 1a is disengageable (i.e., it can be rendered ineffective) in response to the application of centrifugal force. This enables the shaft to rotate in the direction indicated by the arrow $D_1$, i.e., in the winding direction of the band 2a. At such time, the band 2a is not in frictional engagement with the cylindrical internal surface of the rotary component, i.e., it is free to turn counter to the direction indicated by the arrow $D_1$. Once the RPM reaches a certain threshold value (such value is or can be determined, among others, by the spring rate or spring constant of the band 2a), the band expands and bears upon the cylindrical internal surface to block the movements of the component having the cylindrical internal surface in the direction indicated by the arrow $D_1$.

Another embodiment of the improved freewheel, which can permit or prevent angular movements of two coaxial components (one of which surrounds the other) relative to each other includes the structure of FIG. 1 which is set up to ensure that the shaft and the component surrounding the band 2 can rotate with or relative to each other. The modified freewheel is responsive to centrifugal force which can be utilized to regulate the operation of the freewheel in such a way that the shaft as well as the surrounding rotary component can turn jointly as well as independently of each other. The arrangement can be such that the shaft and the surrounding component are held against rotation relative to each other in the direction of the arrow D until their RPM reaches a certain value because the band is prevented from moving relative to the shaft. The freewheel opens under the action of centrifugal force when the rotational speeds of such part and of the band exceed the certain value; this releases the outer component for rotation relative to the band 1 in clockwise and counterclockwise directions. Such freewheels are relatively inexpensive and their operation is simple, even when lubricated by oil or grease. In addition, the just described freewheels need not be finished with a degree of precision even approaching that required for the making of conventional freewheels, e.g., those employing clamping devices and/or the like.

Figure 3:
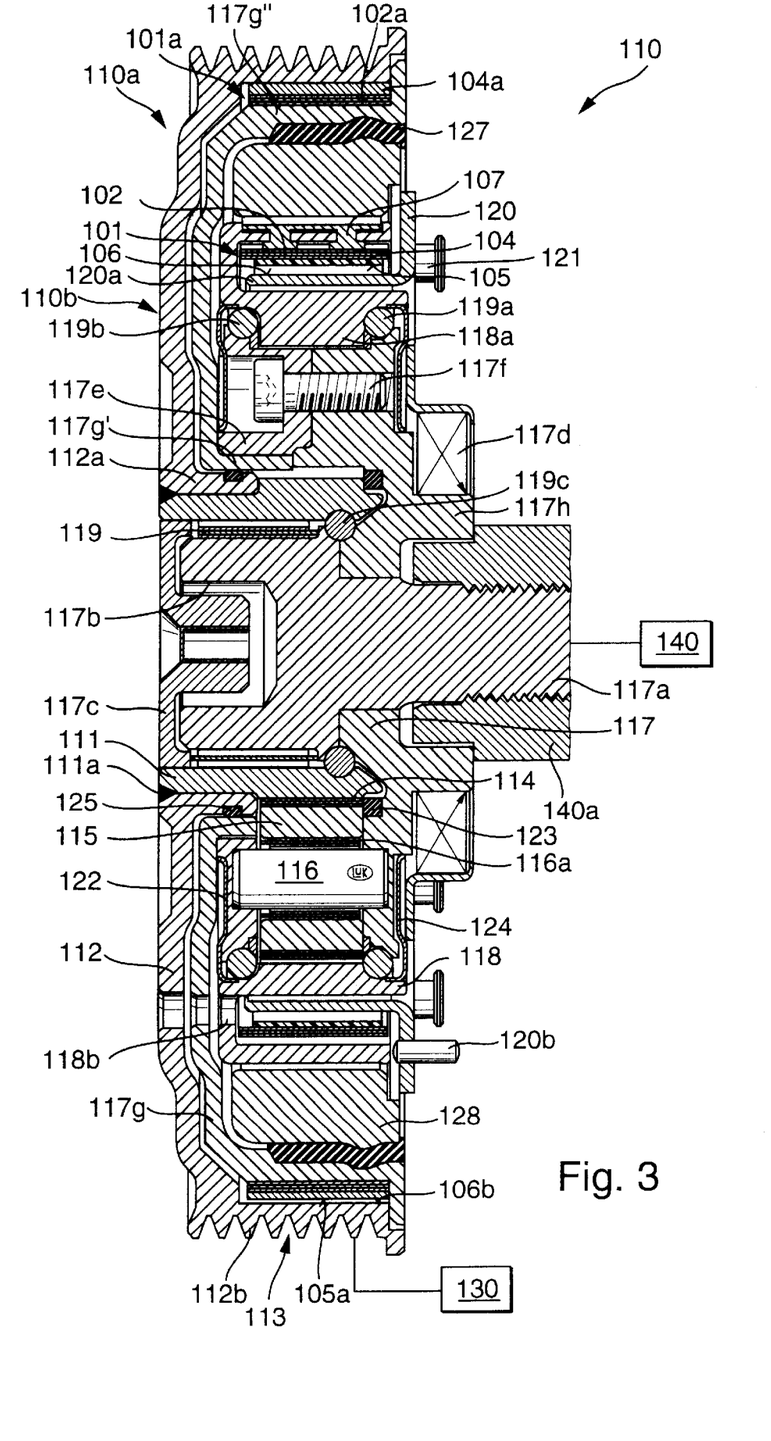
FIG. 3 is a partly diagrammatic and partly axial sectional view of a power train which embodies one form of the invention and employs a planetary transmission, a centrifugal force-operated pull-type freewheel and a centrifugal force-operated push type freewheel.

Another advantage of the improved freewheel (such as 1) is that its band 2 can compensate for eventual departures of the external surface of the shaft and/or the internal surface of the hollow cylindrical component from round as well as for eventual lack of axial alignment of the shaft and the outer component. Still another important advantage of the utilization of the improved band-type freewheel is that it can be installed between a large-diameter shaft and a large-diameter hollow annular or tubular component. For example, such hollow tubular component can carry or can otherwise cooperate with a transmission in a power train (such as the infinitely variable transmission certain details of which are shown in FIG. 3 and which can be utilized in a motor vehicle), particularly in a power train wherein the prime mover includes a starter generator. Still further, the freewheel can be installed in a dry chamber, and it is not necessary to moisturize (such as lubricate) the structure defining the chamber and/or the space which receives the improved freewheel; this, in turn, renders it possible to dispense with a sealing or with an extensive sealing of such chamber from the surrounding atmosphere.

Figure 4:
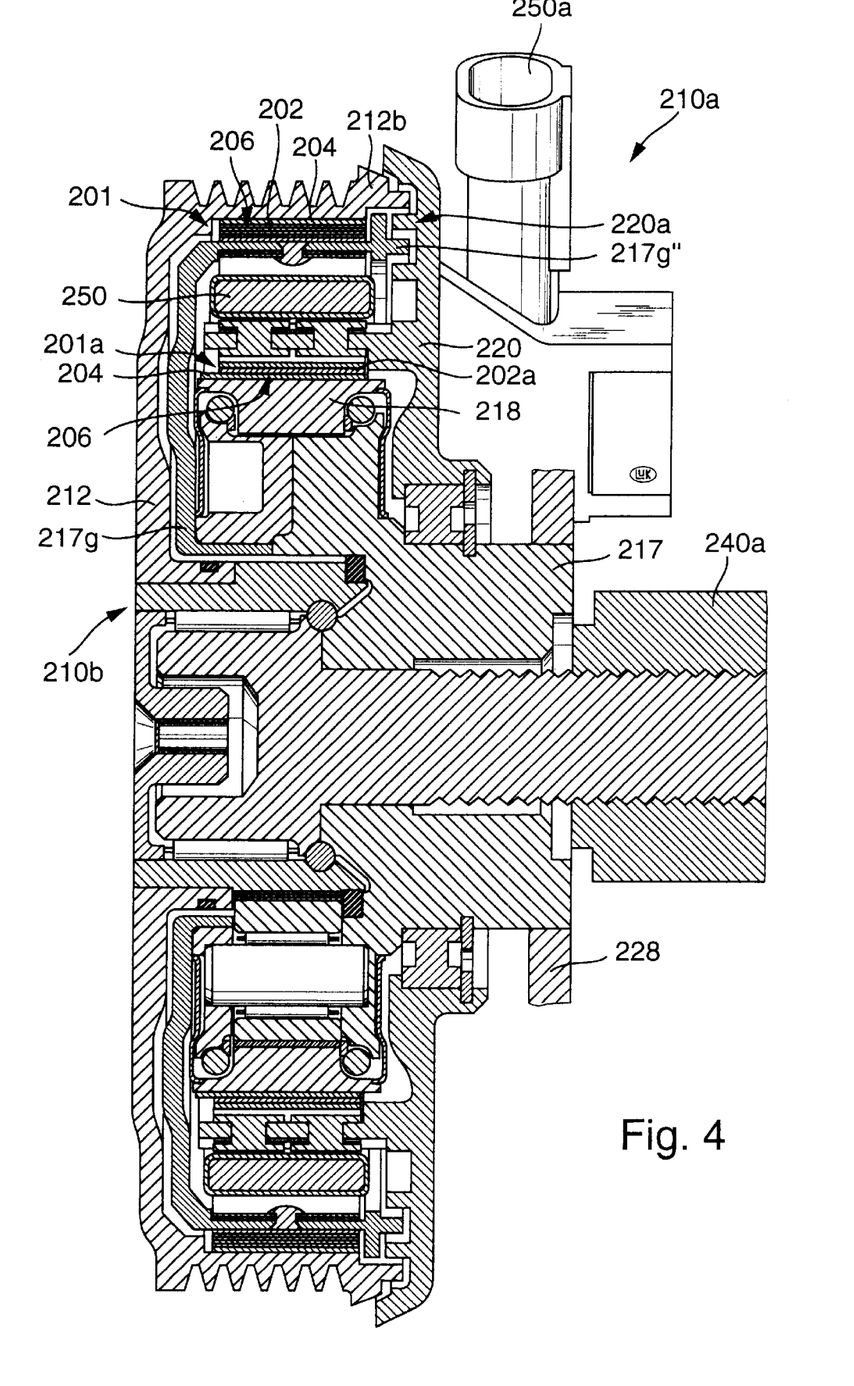
FIG. 4 is a similar view of a modified power train with shiftable freewheels.

FIGS. 3 and 4 illustrate two power trains each of which embodies one or more features of the present invention. Such power trains constitute improvements over certain power trains which are disclosed in the aforementioned published German patent application Serial No. 199 41 705.

Referring first to FIG. 3, there is shown a power train 110 embodying certain features of the instant invention. This power train further comprises a schematically illustrated prime mover 140, e.g., an internal combustion engine having a rotary output member 140a (such as the camshaft of the engine). The power train 110 also includes an electrical machine 130 and means for transmitting torque betwee the prime mover and the rotary input element of the electrical machine. The torque transmitting means comprises an infinitely variable belt transmission 100a having a pulley 112. The plane of the pulley 112 is normal to the plane of FIG. 3, and such plane can accommodate one or more torque receiving parts of other machines (i.e., in addition to the electrical machine 140) such as one or more auxiliary aggregates including, for example, at least one hydraulic pump, air conditioner compressors and/or others. All such machines can receive torque from the endless belt (not shown) which is trained over the pulley 112.

The ratio of a planetary transmission 110b (hereinafter called planetary) is selected in dependency upon the RPM of the crankshaft 140a, and hence in dependency upon the centrifugal force acting upon the belt transmission 110a. The planetary 100b comprises a sun gear or sun wheel 111, a planet pinion carrier 117, planet pinions 115 (only one shown) rotatable on or with shafts 116 installed in the planet carrier 117, and an internal gear 118. The infinitely variable transmission 110a is controlled by two freewheels 101, 101a. The freewheel 101 operates between the planetary pinion carrier 117 and the internal gear 118 of the planetary 110b, and the freewheel 101a operates between the sun gear 111 and the carrier 117.

A support 117a is provided to fixedly secure the transmission 110a on the crankshaft 140a of the prime mover 140; the connection can include threaded fasteners. The front side of the support 117a is profiled, e.g., by providing it with a hexagonal recess 117b. The open left-hand end of the recess 117b is closed by a lid 117c; this lid is or can be applied upon completion of assembly and mounting of the infinitely variable transmission 110a. The carrier 116 of the planetary 110b is fixedly connected (e.g., welded or press fit) to the support 117a. The illustrated planetary 110b is assumed to have three equidistant planet pinions 115, i.e., the carrier 117 mounts three shafts or bolts 116 and each of the planet pinions 115 is mounted on the respective bolt 116 by way of a bearing 116a, e.g., a ball bearing, a roller bearing or the like. Thus, each planet pinion 115 is free to rotate relative to the respective shaft or bolt 116.

The bolts or shafts 116 can be replaced by cylindrical pins which are of one piece with or affixed to the respective planet pinions 115 and are rotatably journalled directly in the carrier 117 or in antifriction bearings provided in the carrier.

In order to prevent the bolts 116 from carrying out axial movements relative to the carrier 117, their left-hand ends abut a disc 117e which is affixed to the carrier 117 by threaded fasteners 117f. This disc has recesses for the adjacent end portions of the bolts 116. The radially innermost portion of the disc 117e and/or the carrier 117 supports a second disc 117g having a radially innermost portion provided with an axial extension 117g'. This extension serves as a means for centering the second disc 117g on the disc 117e. The actual centering means includes mating axially parallel gear teeth and internal splines and one or more fasteners (e.g., screws or bolts) which hold the discs 117e, 117g against axial and/or radial movement relative to each other.

The radially outermost portion of the second disc 117g carries an axial extension 117g" which fixedly mounts the freewheel 101a. The extension 117g" further carries an annular damper mass 128 which is surrounded by a combined metallic and elastic member 127. If the planet pinions 115 require lubrication, they are confined in a chamber which is sealed by sealing elements 122, 123, 124 and 125.

The sun gear 111 is mounted on the planet carrier 117 and on the support 117a by means of a thrust bearing 119c and a radial bearing 119. Each of these bearings can constitute a roller bearing or a friction bearing. Such bearings serve to center as well as to journal the sun gear 111. The teeth 114 of the sun gear 111 mate with the teeth of the planet pinions 115, and this sun gear is fixedly secured to the pulley 112; FIG. 3 shows a welded joint 111a. The sun gear 111 is centered in a sleeve-like extension 112a forming part of the pulley 112 and extending toward the crankshaft 140a, and this extension has an annular groove for the seal 125 which engages the disc 117g. The radially outermost portion of the pulley 112 has a grooved peripheral surface 113 which is engaged by the internal surface of a toothed belt serving to transmit torque to the electrical machine 130 and (if necessary) to one or more additional machines (such as a generator). The cylindrical rim 112b of the pulley 112 (this rim is provided with the grooved peripheral surface 113) has a cylindrical peripheral friction surface 106 which is or can be brought in contact with the friction surface 105a of the band forming part of the freewheel 101a.

The planet carrier 117 and the disc 117a cooperate to define a centering seat with axial and radial surfaces for bearings 119a, 119b, e.g., annuli of circumferentially distributed rollers, spheres or the like, which engage the internal gear 118. The internal teeth 118a of the gear 118 mate with the external teeth of the planet pinions 115.

The internal gear 118 is provided with an internal pocket 118b which can be formed in this gear by resorting to a suitable shaping technique and which serves to accommodate the freewheel 101. To this end, the belt 102 of the freewheel 101 is affixed to one end of the internal gear 118, e.g., by means of a circular array of rivets 107. Other suitable connecting means (which can replace or which can be utilized jointly with the rivets 107) include a welded joint or a series of welded spots, a caulking procedure, hooks or any other suitable means.

The internal surface of the band 102 carries a friction lining 104 having a friction surface 105. The surface 105 can engage (when necessary) the adjacent friction surface 106 which is provided at the exterior of an extension 120a forming part of a component 120. The latter is connected to the housing or casing (not shown) of the engine 140 by pins 120b, by threaded fasteners 121 or in any other suitable manner. The planet pinion carrier 117 has a radially inner axially extending portion 117h which receives a seal 117d.

The mode of operation of the power train 110 including the structure shown in FIG. 3 is as follows:

The operation includes two modes or stages. During the first stage, the electrical machine 130 drives the crankshaft 140a to start the combustion engine 140. Once the engine is started, the first stage is followed by the second stage during which the engine 140 is accelerated and the electrical machine 130 is operated as a generator.

It is advisable to resort to a first range of RPM during the first stage and to a different second range of RPM during the second stage. Thus, one operates with a high transmission ratio to lower the speed during starting of the electrical machine 130 but this machine should be operated at a high speed when the operational speed of the engine 140 is normal, i.e., the efficiency of the machine 130 should be maintained at a maximum value when the engine 140 is on. The RPM of the crankshaft 140a should be low during the first stage of operation; therefore, the planetary 110b is set to ensure that its pinions 115 reduce the speed with the result that, during the first stage, the freewheel 101 is operative, i.e., that the internal gear 118 of the planetary 110b is non-rotatably coupled to the housing of the engine 140 so that the friction surface 105 of the friction lining 104 cannot slip relative to the friction surface 106 of the housing component 120. This is accomplished in that, when the engine 140 is idle, the band 102 of the flywheel 101 is stressed so that it bears upon the friction surface 106 of the component 120. The band 102a of the freewheel 101a bears upon the extension 107g" of the disc 107 so that the friction surface 105a of the friction lining 104a does not bear upon the complementary surface 106a of the rim 112b of the pulley 112.

If the electrical machine 130 is started to transmit torque to the sun gear 111 of the planetary 110b by way of the pulley 112, the sun gear drives the planet pinions 115 while the freewheel 101 holds the housing of the combustion engine 140 because the internal gear 118 cannot rotate. Thus, the shafts 116 of the pinions 115 turn the carrier 117 which rotates the crankshaft 140a. When the RPM of the crankshaft 140a increases subsequent to starting of the engine 140, centrifugal force causes the band 102 of the freewheel 101a to move radially outwardy with the result that the friction surfaces 105, 106 cease to transmit torque. Substantially or exactly at the same time, centrifugal force causes the band 102a and the friction lining 104a to move radially outwardly in response to increasing RPM whereby the friction surface 105a of the friction lining 104a engages the friction surface 106a of the pulley 112 and such frictional engagement between the pulley and the disc 117g (which is fixed to the planet pinion carrier 117) increases. In other words, the RPM of the planet pinion carrier 117 and pulley 112 then matches the RPM of the crankshaft 140a and the planetary 110a is bypassed. The internal gear 118 of the planetary 110a rotates at the same speed because the planet pinions 115 cannot rotate about the axes of their respective shafts 116 and relative to the housing component 120. This is due to the fact that the centrifugal force interrupts the frictional engagement between the housing component 120 and the internal gear 118. All in all, the thus reached stage of operation of the power train involves the establishment for the belt transmission 101 of an internal transmission ratio of i=1. To this is added a preselectable transmission ratio due to the relationship between the diameters of the pulley 111 and the pulley (not shown) on the input-output shaft of the electrical machine 130. The freewheel 101a ensures that angular vibratory movements of the crankshaft 140a are not transmitted to the input-output shaft of the electrical machine 130.

The freewheels 101 and 101a are set to operate counter to each other at a certain RPM of the crankshaft (output shaft) 140a. The freewheel 101a is installed in the power flow between the sun gear 111 and the planet pinion carrier 117, and the freewheel 101 is installed in the power flow between the internal gear 118 and the housing component 120. The mass 128 is connected to the output shaft 140a, i.e., it is integrated into the transmission of the power train; this mass serves to damp vibrations (especially angular vibrations) of the shaft 140a. Such mass can be installed radially outwardly of the pulley which, in such power trains, normally establishes a connection to the electrical machine and/or to other auxiliary aggregate(s), for example, to increase the moment of inertia with a reduced mass.

FIG. 4 illustrates a portion of a power train 210 including an infinitely variable belt transmission 210a which is similar to the transmission 110a of the power train shown in FIG. 3. The transmission 210a comprises two freewheels 201, 201a and an electromagnet 250 which latter serves to actuate the freewheel 201a. When the belt transmission 210a is idle, i.e., when the shaft 240a of the prime mover does not rotate, the bands of the two freewheels 201, 201a are under tension so that the freewheel 201 does not establish a frictional engagement with the pulley 212 and the freewheel establishes a fixed connection between the internal gear 218 of the planetary 210b and the housing component 220. The band 202 of the freewheel 201a is fixedly secured to the housing component 220.

The above holds true during the initial stage of operation of the power train 210a, i.e., during starting of the prime mover (such prime mover is or can be identical with the engine 140 in the power train 110 of FIG. 3). At such time, the electromagnet 250 is not energized. However, it is also possible to resort to a different setting of the freewheels 201 and 201*a*, namely to a setting at which the electromagnet 250 is energized and, therefore, the (non-illustrated) ram which is actuated by the electromagnet 250 exerts a radial pressure upon the band 202*a* of the freewheel 201*a* so that the surface of the friction lining 204 on the band 202*a* comes into frictional engagement with the complementary surface 206 of the internal gear 218 in the planetary 210*b*. Such frictional engagement increases automatically with increasing RPM due to the aforementioned Eytelwein's formula to ensure that the internal gear 218 of the planetary 210 cannot turn relative to the housing of the combustion engine.

The operation of freewheel 201 is dependent upon the magnitude of the centrifugal force, the same as that of the freewheel 101*a* in the power train 110 of FIG. 3. However, it is also possible to operate or actuate the freewheel 201 in response to the application of an external force, e.g., by that force which is generated by the electromagnet 250. The latter controls the operation of the freewheel 201*a*. Under such circumstances, the band 202 turns relative to a fixed part (such as a ram) of the electromagnet whereby the ram exerts upon the band 202 a force preferably without actually contacting the band, namely through a magnetic field, or on disengagement by a bearing as a result of rotation of the ram and the band 202 relative to each other. The radially movable ram which acts upon the band 202 can be the same as that which is used to act upon the band 202*a*.

The electromagnet 250 can be energized by way of a cable in a sheath 250*a* which confines the necessary current supplying and/or control signal transmitting conductor means.

A further difference between the power trains 110 and 210*a* is that the flywheel or mass of the power train 210*a* is expanded radially outwardly of the pulley 212 and constitutes a disc 228 (only a portion of this disc is shown in FIG. 4) which is guided at its radially outer part and is fixedly connected with the planet carrier 217. This disc 228 carries at its periphery a preferably annular flywheel or mass which is located radially outwardly of the disc 212.

Furthermore, the housing component 220 is of one piece (i.e., it is not assembled of two or more parts) and cooperates with the axial extension or rim 212*b* of the pulley 212 and with the axial projection 217*g*" to form a labyrinth seal 220*a* against the penetration of foreign matter into the space for the freewheels. It is further to be noted that, in contrast to the freewheel 101*a* in the power train of FIG. 3, the freewheel 201*a* is mounted on the housing and has a friction surface which engages the complementary friction surface 206 of the internal gear 218.

It is further clear that, in accordance with the present invention, the freewheels, their components and the actuating means therefor can be mounted on or in or associated with the corresponding constituents of the improved power train (namely with the constituents which are to be frictionally connected thereby) in a number of additional ways in dependency upon the design and/or the distribution of parts in the power train. For example, the complementary friction surfaces can be located radially inwardly or outwardly and/or the bands can be fixed to the housing or can be provided in or on a rotary component. It is normally preferred to mount the freewheel actuating means on the housing. Furthermore, additional (such as hydraulic or hydropneumatic) actuating means can be put to use in addition to or in lieu of those disclosed hereinbefore. Last but not least, it is possible to combine electromagnetic, hydraulic, mechanical and/or centrifugal force-operated band utilizing freewheels with each other.

The character 204 shown in FIG. 4 denotes the friction lining on the band 202, and the character 217*g* denotes a disc corresponding to the disc 117*g* in the power train 110 of FIG. 3.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the above outlined art of transmissions for use in the power trains of motor vehicle and the like and, therefore, such adaptations should and are intended to be comprehended within the meaning and range of equivalence of the appended claims.

What is claimed is:

1. A power train, for use in motor vehicles, comprising:
   a variable-speed prime mover machine having a rotary element;
   at least one electrical machine; and
   means for transmitting torque between said rotary element and said at least one electrical machine, including
      a planetary, and
      at least one engageable and disengageable freewheel between said planetary and said at least one electrical machine and including an elongated band having a first friction surface engageable with a first complementary surface provided on a rotary component of one of said planetary and said one machine and a second friction surface engageable with a second complementary surface on a component of the other of said planetary and said one machine, one of said components being rotatable relative to the other of said components when at least one of said friction surfaces is disengaged from the respective complementary surface.

2. The power train of claim 1, wherein said prime mover machine includes an internal combustion engine and said rotary element is a shaft of said engine, said at least one electrical machine being arranged to start said engine during a first stage of operation of the power train and said engine being arranged to drive said at least one electrical machine during a second stage of operation of the power train.

3. The power train of claim 2, wherein said at least one electrical machine is arranged to convert mechanical energy into electrical energy at least during said second stage of operation of the power train.

4. The power train of claim 1, wherein said planetary comprises a rotary sun gear member, a planet carrier member, at least one planet pinion member rotatably journalled in said carrier member and mating with said sun gear member, and an internal gear member mating with said at least one pinion member, said band having a portion fixedly connected with one of said members.

5. The power train of claim 4, wherein said torque transmitting means further comprises a second freewheel operable to transmit torque between two members of said planetary.

6. The power train of claim 4, wherein said at least one freewheel is operable to transmit torque between a member of said planetary and a housing for said prime mover machine.

7. The power train of claim 4, wherein said at least one freewheel is operable to transmit torque between said rotary element of said prime mover machine and a member of said planetary, said torque transmitting means further including a second freewheel actuatable to transmit torque between a member of said planetary and said at least one electrical machine.

8. The power train of claim 4, wherein said at least one freewheel is arranged to transmit torque between said sun gear member and said planet carrier member, said torque transmitting means further comprising a second freewheel operable to transmit torque between said internal gear member and a housing of said prime mover machine.

9. The power train of claim 1, wherein said band includes a friction lining and one of said friction surfaces is provided on said friction lining.

10. The power train of claim 9, wherein said friction lining includes a plurality of sections spaced apart from each other lengthwise of said band.

11. The power train of claim 1, wherein said at least one freewheel includes a layer of slippage promoting agent applied to one of said friction surfaces of said band.

12. The power train of claim 11, wherein said band includes a friction lining, the other of said friction surfaces being provided on said friction lining.

13. The power train of claim 11, wherein said slippage promoting agent contains a plastic material.

14. The power train of claim 13, wherein said plastic material is a fluorpolymer.

15. The power train of claim 1, wherein said band is tensioned.

16. The power train of claim 15, wherein said band is out of contact with one of said complementary surfaces in the disengaged condition of said freewheel.

17. The power train of claim 1, wherein said band is arranged to become disengaged from one of said complementary surfaces under the action of centrifugal force.

18. The power train of claim 1, further comprising means for changing the condition of said freewheel, said condition changing means including an electromagnet.

19. The power train of claim 1, wherein said torque transmitting means further comprises a second freewheel arranged to operate counter to said at least one freewheel, said freewheels having a switching point at a predetermined rotatonal speed of an output element and one of said freewheels being disposed in a power flow between a sun gear and a planet carrier of said planetary, the other of said freewheels being disposed between an internal gear of said planetary and a housing of said prime mover machine.

20. The power train of claim 1, further comprising a flywheel affixed to said rotary element.

* * * * *